(12) United States Patent
Dershem et al.

(10) Patent No.: US 7,156,200 B2
(45) Date of Patent: Jan. 2, 2007

(54) MAIN FRAME FOR A TRACKED SKID STEER LOADER MACHINE

(75) Inventors: Brian R. Dershem, Sanford, NC (US); Reid W. Waitt, Angier, NC (US)

(73) Assignee: Caterpillar S.A.R.L., Geneva (CH)

( * ) Notice: Subject to any disclaimer, the term of this patent is extended or adjusted under 35 U.S.C. 154(b) by 634 days.

(21) Appl. No.: 09/905,703

(22) Filed: Apr. 19, 2001

(65) Prior Publication Data

US 2004/0026153 A1 Feb. 12, 2004

(51) Int. Cl.
B62D 21/00 (2006.01)
(52) U.S. Cl. .................................. 180/311; 280/781
(58) Field of Classification Search .............. 280/781, 280/785; 180/311, 312; 296/35.1, 204, 296/205
See application file for complete search history.

(56) References Cited

U.S. PATENT DOCUMENTS

| | | | | |
|---|---|---|---|---|
| 2,002,474 | A | * | 5/1935 | Johnston et al. ............. 180/312 |
| 3,328,049 | A | | 6/1967 | Luterbach |
| 3,728,909 | A | | 4/1973 | Jespersen |
| 3,776,325 | A | * | 12/1973 | Jespersen ................... 180/6.48 |
| 4,049,072 | A | | 9/1977 | Savage |
| 4,055,262 | A | | 10/1977 | Bauer et al. |
| 4,060,261 | A | | 11/1977 | Bauer et al. |
| T966,007 | I4 | | 1/1978 | Liehr et al. |
| 4,074,782 | A | | 2/1978 | Bauer |
| 4,131,225 | A | | 12/1978 | Bauer et al. |
| 4,150,474 | A | | 4/1979 | Bauer et al. |
| 4,151,920 | A | | 5/1979 | Shoup |
| 4,168,757 | A | | 9/1979 | Mather et al. |
| 4,514,007 | A | * | 4/1985 | Macht ......................... 180/311 |
| 4,955,455 | A | * | 9/1990 | Albright et al. ............ 180/291 |
| 4,962,825 | A | * | 10/1990 | Albright et al. ............ 180/292 |
| 5,293,949 | A | * | 3/1994 | Zimmermann ............. 180/9.48 |
| 5,568,841 | A | | 10/1996 | Weissbach |
| 5,611,105 | A | * | 3/1997 | Blehert et al. ................ 15/320 |
| 6,098,739 | A | | 8/2000 | Anderson et al. |
| 6,108,907 | A | | 8/2000 | Anderson et al. |
| 6,138,786 | A | * | 10/2000 | Anderson et al. ........... 180/312 |
| 6,167,980 | B1 | | 1/2001 | Anderson et al. |
| 6,293,364 | B1 | * | 9/2001 | Anderson et al. ........... 180/312 |
| 6,540,286 | B1 | * | 4/2003 | Takemoto et al. .......... 296/204 |

FOREIGN PATENT DOCUMENTS

GB 2337965 A 12/1999
JP 05085422 A * 4/1993

* cited by examiner

Primary Examiner—Paul N. Dickson
Assistant Examiner—Laura B. Rosenberg
(74) Attorney, Agent, or Firm—Diana L. Charlton; William A. Beckman

(57) ABSTRACT

A frame for a tracked skid steer loader machine or multi-terrain loader machine is provided having a structural design that enables the loader machine to be modularly assembled using a variety of pre-assembled components, namely a lower frame assembly, an upper frame assembly and an undercarriage. The lower frame assembly includes a pair of recessed channels formed on a base portion of the lower frame assembly and extending the width of the lower frame assembly. The undercarriage includes right and left track assemblies connected by a pair of crossmembers. Each recessed channel is engagingly associated with a respective crossmember of the undercarriage, thereby allowing for the modular assembly of a loader machine when the recessed channels of the lower frame assembly are mounted over the crossmembers of the undercarriage. An upper frame assembly may be mounted on the lower frame assembly before or after the lower frame assembly is mounted onto the undercarriage.

11 Claims, 7 Drawing Sheets

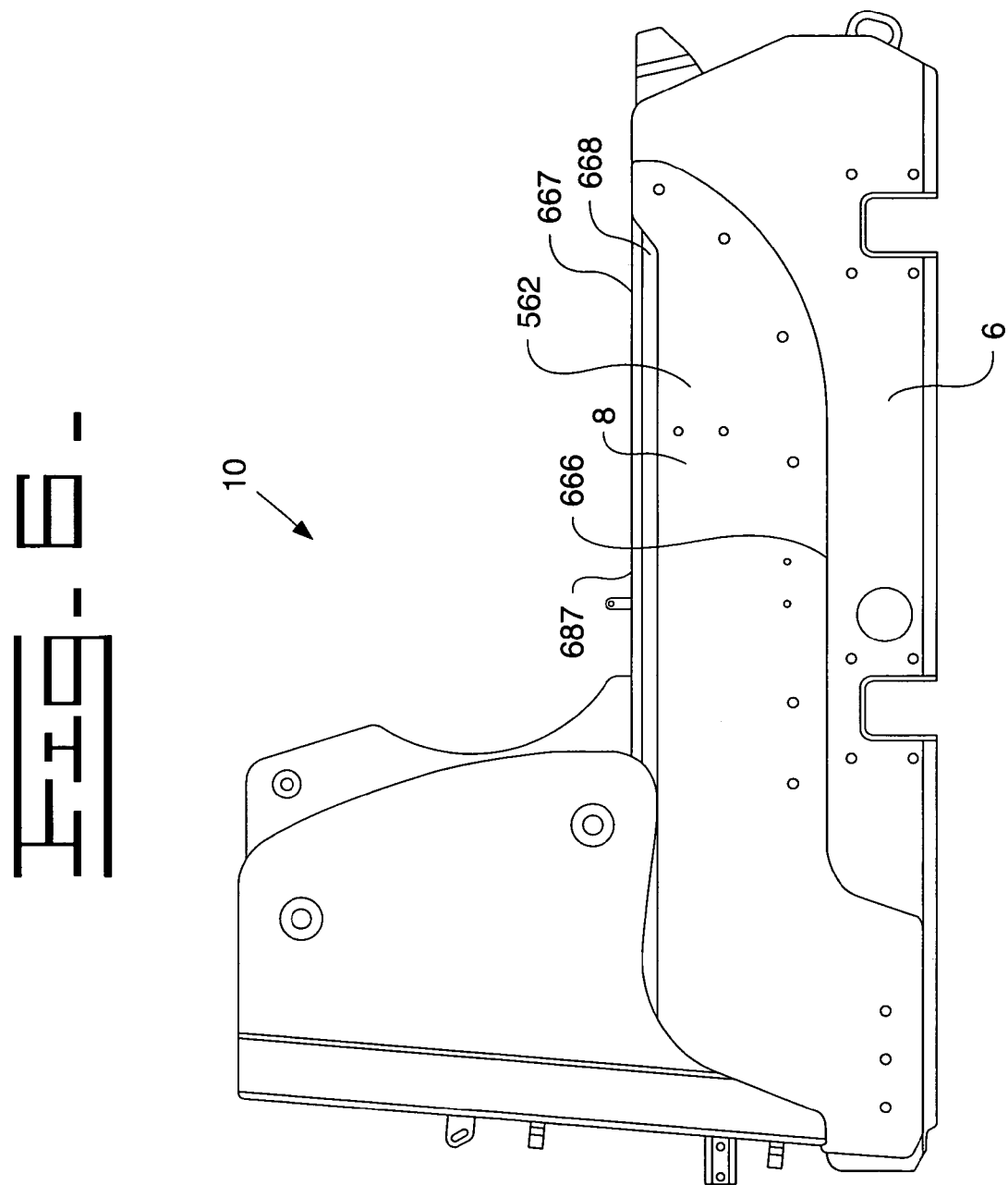

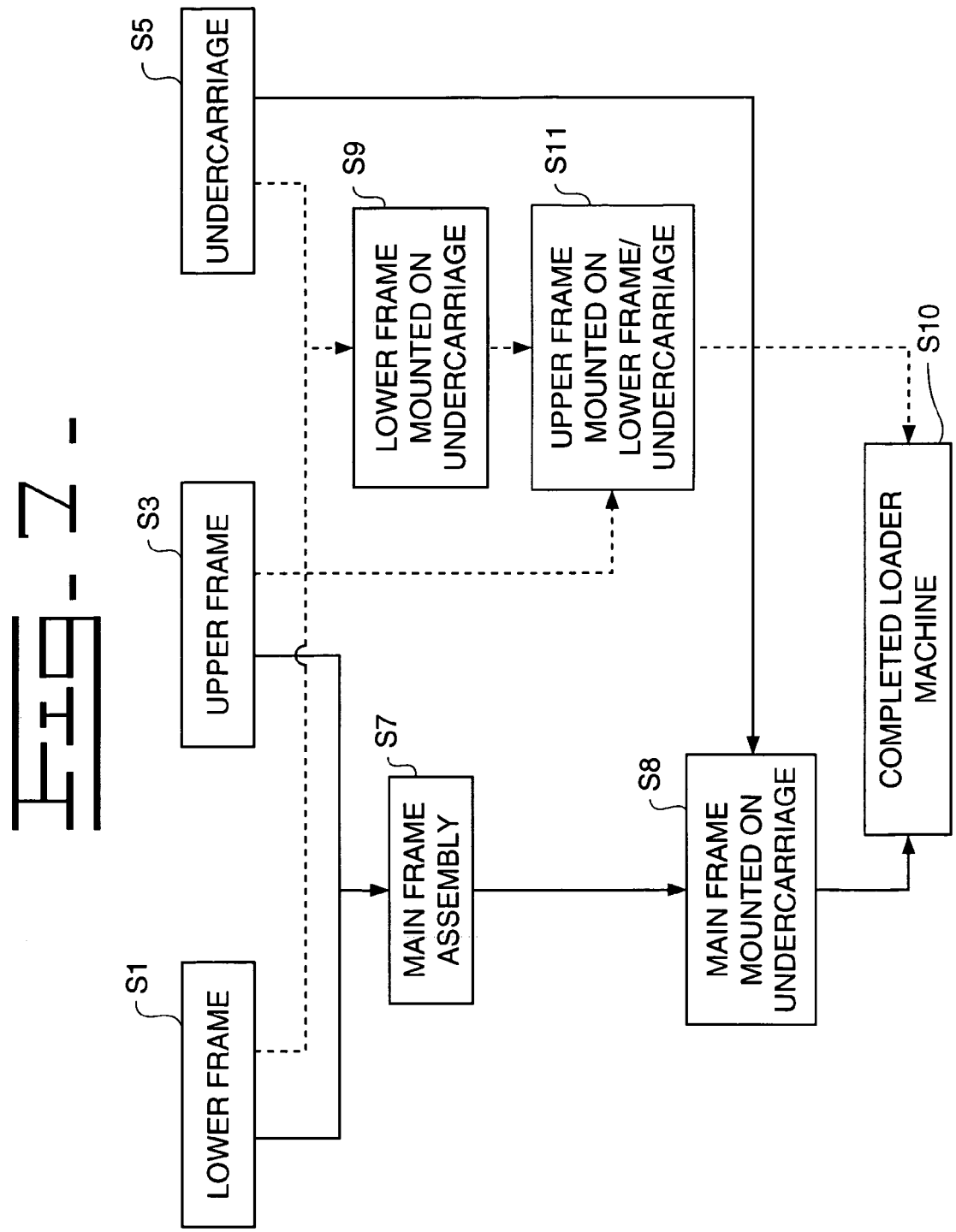

MAIN FRAME FOR A TRACKED SKID STEER LOADER MACHINE

TECHNICAL FIELD

This invention relates generally to a main frame assembly for a tracked skid steer loader machine or multi-terrain loader machine and more particularly to such a machine having a main frame assembly, including a lower frame assembly capable of modular assembly with an undercarriage.

BACKGROUND

Skid steer loader machines are manufactured to provide a compact work machine that is maneuverable and durable in various applications. Skid steer loader machines are propelled by independently driven wheels on opposite sides of the vehicle that can be driven at different speeds and in different directions. Some skid steer loader machines use a loader body or lower frame assembly, in conjunction with a subframe or upper frame assembly, to define a main frame assembly for the loader machine. The lower frame assembly typically includes axle openings within which axles are disposed. The main frame may be assembled in a variety of ways to provide effective serviceability and durability.

Tracked skid steer loader machines or multi-terrain loader machines utilize an endless track undercarriage in place of the independently driven wheels to provide greater traction in mud, snow, ice and the like. An all-terrain vehicle is disclosed in U.S. Pat. No. 3,728,909 issued on Apr. 24, 1973 to Herbert A. Jesperson that is designed for high capability of travel over difficult and rough ground contours, conditions and textures. In particular, the Jesperson patent includes a body that has a center section with a bottom wall and front and rear walls extending from the bottom wall. Opposing side walls extending from the bottom wall and from the front and rear walls generally complete the center section. Located transversely on the underside of the bottom wall are a plurality of spaced parallel downwardly open channels which are formed in the continuous bottom wall surface. The channels cooperate with the track suspension group to permit modular assembly while, at the same time, affording maximum vertical clearance under the bottom wall and between the tracks, consistent with maintaining watertight integrity of the body and maximum depth to afford sufficient space in the center section for the power group and the user's legs. In this regard, the track suspension group includes a frame having a plurality of structural cross members which are respectively and individually located in the respective downwardly open channels. The cross members are connected to the body by means in the form of plates which are welded to the cross members and adapted to span the ends of the channels and contact the exterior surface of the side margins around the channel ends. Screws or bolts are used to attach the plates to the side walls of the body. Although the open channels provide vertical clearance and depth, axial loads from the upper portion of the machine are directed on the screws or bolts attaching the cross members with the body. Therefore, such screws or bolts are likely to incur shear or torsional stresses that may damage or destroy the screws or bolts and, thereby, weaken the assembly. Further, the depth utilized to mount the cross members is not sufficient to lower the center of gravity of the machine to a maximum level.

The present invention is directed to overcoming the problems, as set forth above, by providing a structural design that enables a multi-terrain loader machine to be modularly assembled by mounting a solitary lower frame assembly or a fully assembled main frame to a pre-assembled undercarriage in a manner that distributes axial loading on the undercarriage.

SUMMARY OF THE INVENTION

In one aspect of the present invention, a frame assembly for a loader machine is disclosed that has an undercarriage with at least one crossmember. The frame assembly comprises a main frame assembly with a base portion and front and rear sections. At least one recessed channel is defined on the base portion of the main frame assembly. The at least one recessed channel extends across at least a portion of the width of the base portion for seating upon the at least one crossmember.

In another aspect of the present invention, a frame assembly for a loader machine is disclosed with an undercarriage that has at least one crossmember. The frame assembly comprises a main frame assembly with a base portion and front and rear sections. At least one recessed opening is defined on the base portion of the main frame assembly. The at least one opening extends across at least a portion of the width of the base portion. The at least one opening is operably engagable with the at least one crossmember in a manner that distributes a vertical load of the loader machine substantially evenly along the at least one crossmember.

The present invention provides modular assembly of a main frame and an undercarriage. The modular assembly includes the use of at least one recessed opening defined in the main frame assembly that is seated upon at least one crossmember of the undercarriage. Such assembly provides external torsional strength and transverse support to the multi-terrain loader machine because the seating of the recessed opening on the crossmember evenly distributes the vertical load of the machine along the length of the crossmembers. Furthermore, because the recessed opening is seated on the crossmember, the machine's center of gravity is lowered to a maximum level, thereby resulting in additional machine stability.

BRIEF DESCRIPTION OF THE DRAWINGS

The invention and advantageous refinements thereof are explained in more detail below with the aid of diagrammatic, exemplary embodiments in the drawing, in which:

FIG. 6 provides a side view of the main frame assembly; and

FIG. 7 is a flow chart illustrating the modular assembly methods enabled using the structural design of the present invention.

DETAILED DESCRIPTION

Figure 1:
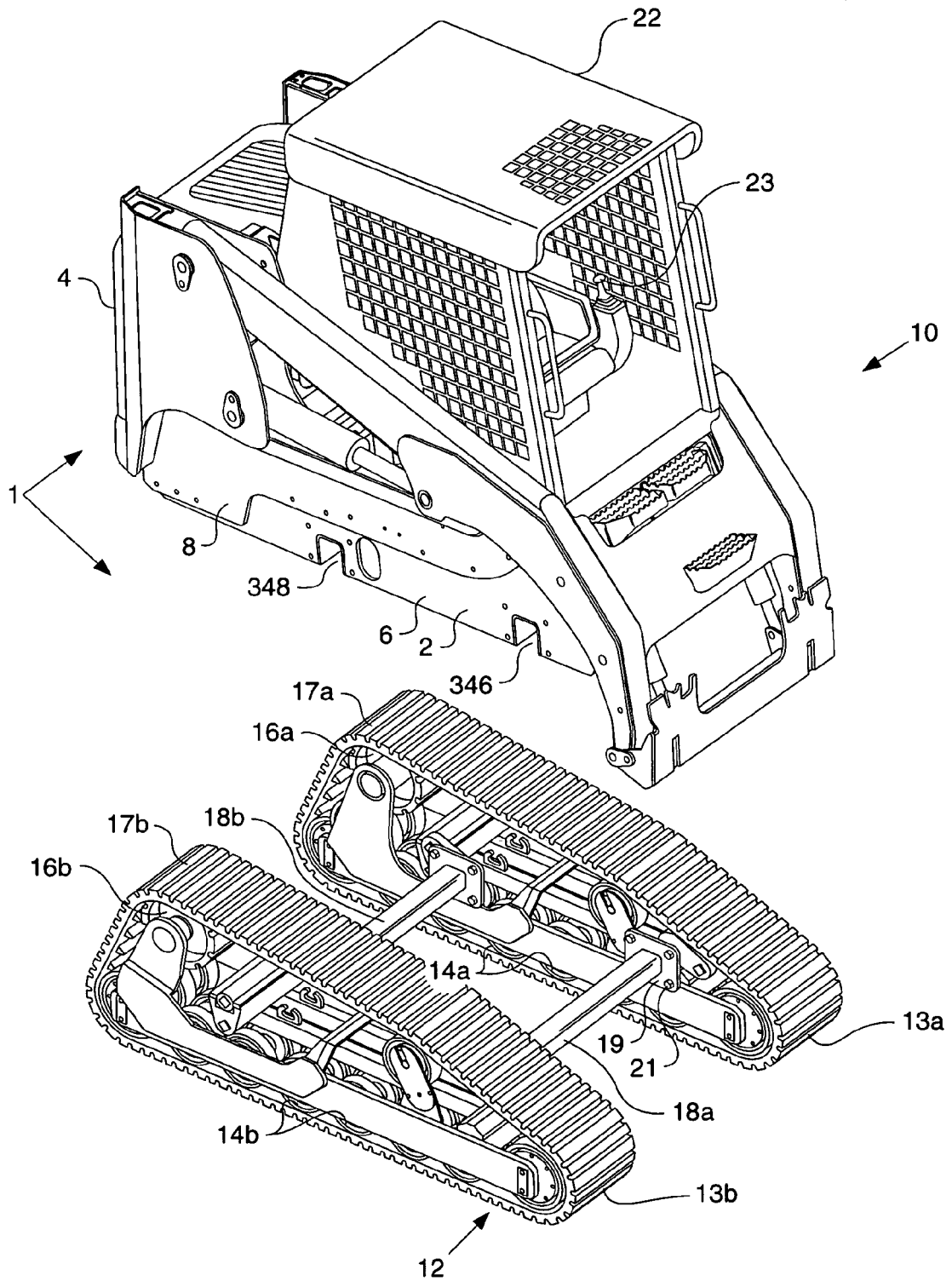
FIG. 1 shows a tracked multi-terrain loader machine in an exploded, perspective view.

While the invention described herein is susceptible to various modifications and alternative forms, one or more specific embodiments thereof have been shown solely by way of example in the drawings and are herein described in detail. It should be understood, however, that there is no intent to limit the invention to the particular form disclosed, but on the contrary, the intention is to cover all modifications, equivalents, and alternatives falling within the spirit and scope of the invention as defined by the appended claims.

In the following description of the invention, an overview will be provided, followed by a description of the structure of the lower frame assembly. Then, a general description of the upper frame assembly will be disclosed. Further, a general explanation of the various modular assembly methods for mounting the main frame assembly to the undercarriage will be provided.

Overview of a Modularly Assembled Work Machine

Referring to FIG. 1, a loader machine 1 incorporating the features of the present invention and commonly known as a tracked skid steer loader or multi-terrain loader, is shown. Generally, the loader machine 1 has a front and rear end portion 2, 4. The loader machine 1 further includes a lower frame assembly 6 and an upper frame assembly 8, which are mounted together to define a main frame assembly 10, as further illustrated in FIG. 2.

The main frame assembly 10 is operable to be modularly assembled with an undercarriage 12 as shown in FIG. 1. Although the present invention is not limited to any specific undercarriage, a preferred embodiment of the undercarriage as depicted in FIG. 1 and used herein for exemplary purposes, is a tracked undercarriage 12. The tracked undercarriage 12 includes a right and a left track assembly 13a, 13b. As illustrated in FIG. 1, the track assemblies 13a,13b include a set of wheels 14a,14b, driven by a drive 16a,16b, and surrounded by a track 17a,17b. Each drive 16a, 16b typically comprises one or more hydraulic motors (not shown) that are controlled to operate at multiple speeds and in a forward and reverse direction, thereby providing the capability for controlled skid steering capability. The track assemblies 13a, 13b are connected via front and rear crossmembers 18a, 18b. Crossmembers 18a, 18b are attached to plates 19 that are affixed to the track assemblies 13a, 13b, respectively, by bolts 21.

The loader machine 1 is controlled by an operator (not shown) from within an operator's compartment 22. Through a joystick device 23, the operator (not shown) controls the loader machine 1 in a specific manner to achieve independent movement of the sets of wheels 14a, 14b within the right and left track assemblies 13a, 13b.

The Lower Frame Assembly

Figure 2:
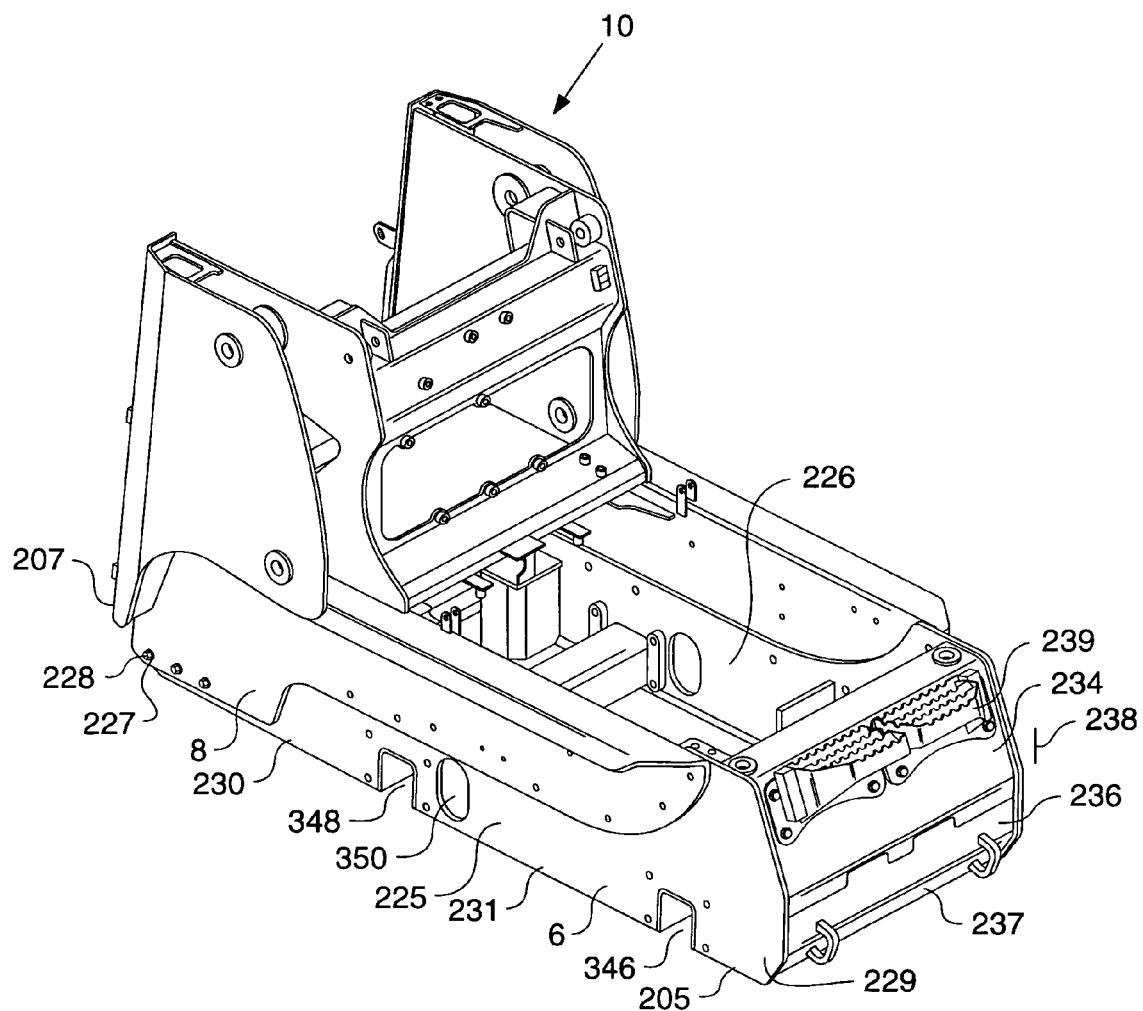
FIG. 2 shows an assembled main frame assembly having an upper frame assembly and a lower frame assembly according to the present invention.
Figure 3:
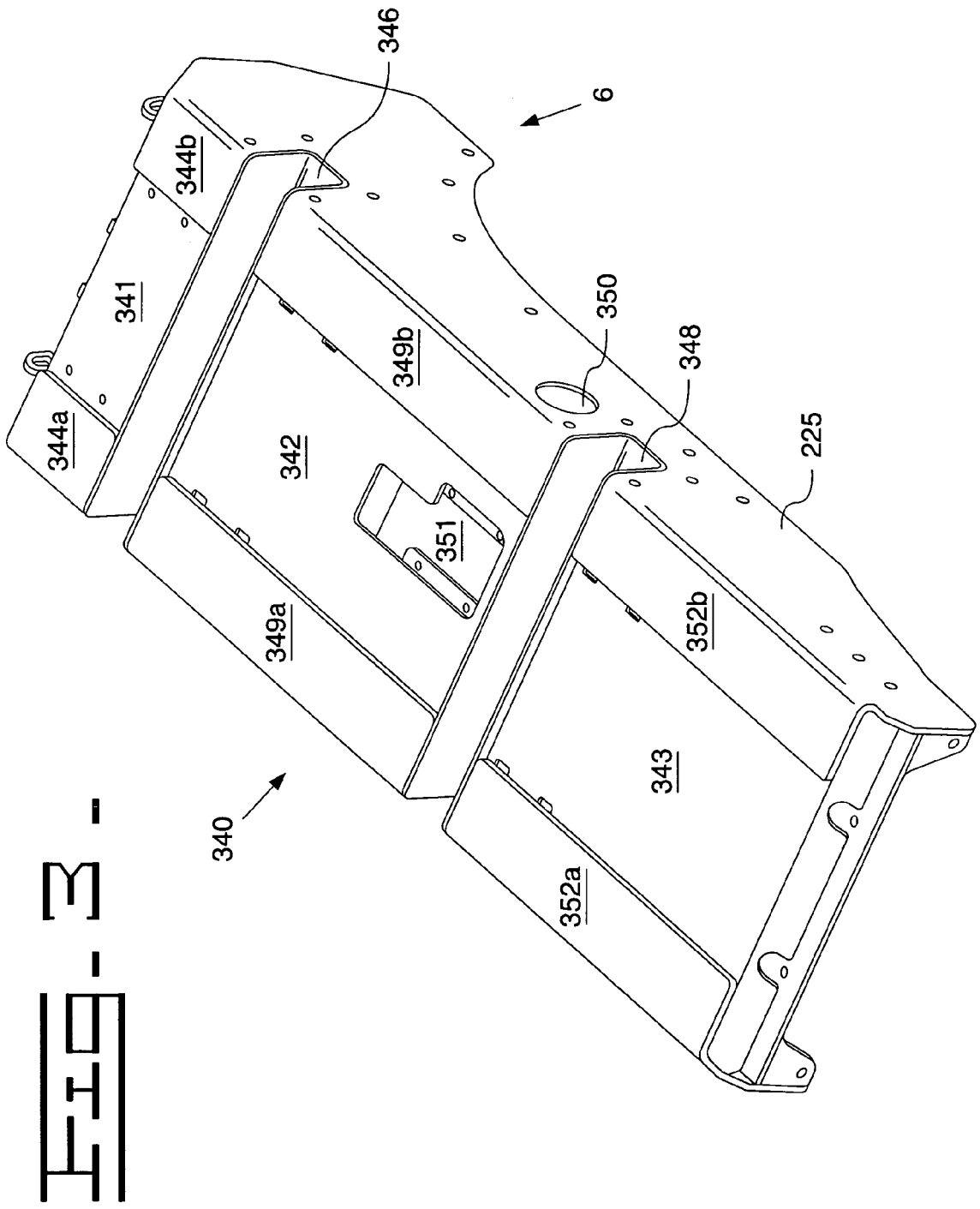
FIG. 3 shows the underside of the lower frame assembly.

Referring to FIG. 2, a main frame assembly 10 with the upper frame assembly 8 and the lower frame assembly 6 according to the present invention is shown. The lower frame assembly 6 has a front end portion 205 and a rear end portion 207 and includes a pair of spaced, vertically oriented metallic side rails 225, 226 that advantageously can be manufactured from a medium strength steel. The side rails 225, 226 extend along the entire length of the lower frame 6 and have a plurality of mounting holes, an exemplary one of which is indicated by reference numeral 227, configured to receive bolts 228 for attaching the upper frame assembly 8 to the lower frame assembly 6. Each pair of side rails 225,226 has a front and rear end portion 229, 230, respectively, that defines the front and rear end portions 229, 230 of the loader machine. A pair of recessed channels 346, 348, operable to receive the crossmembers 18a, 18b, respectively, of an undercarriage, as will be described below and shown best in FIG. 3, is located near the respective front and rear end portion 229, 230 of the side rails 225, 226. Additionally, an intermediate portion 231 is disposed between the front and rear portions 229, 230 of the side rails 225, 226.

At the front portion 229 of the side rails of the lower frame assembly 6, a substantially vertical metal supporting wall 234 and an upper connecting wall 236 are joined to side rails 225, 226 and, respectively, extend upwardly therefrom and therebetween. The upper connecting wall 236 adjoins a lower connecting wall 237, preferably at an angle, as illustrated in FIG. 2, which also joins to side rails 225, 226. The upper and lower connecting walls 236, 237 and supporting wall 234 define a front wall 238 of the loader machine. A pair of step assemblies 239 is attached to the supporting wall 234.

Referring now to FIG. 3, the base or belly portion 340 of the lower frame assembly 6 is shown. Specifically, the base portion 340 of the lower frame assembly 6 includes three horizontally oriented protective plates 341, 342 and 343. A first horizontally oriented front protective plate 341 abuts the lower connecting wall 237 and extends rearwardly between the side rails 225, 226. It should be understood that the front protective plate 341 forms a front portion of the base or belly portion 340 of the loader machine. According to one embodiment of the present invention, the front protective plate 341 extends between and is welded to the side rails 225, 226. In a preferred embodiment, the front plate 341 is reinforced by front reinforcement strips, 344a, 344b which extend horizontally along the undersides of the front plate 341, as shown in FIG. 3. Preferably, the front reinforcement strips 344a, 344b are welded to the front protective plate 341 and to the respective side rails 225, 226.

The second horizontally oriented intermediate protective plate 342 is positioned between front and rear recessed channels 346, 348 and also forms a portion of the bottom base or belly 340 of the lower frame assembly 6. According to one embodiment, the intermediate protective plate 342 extends between and is welded to the side rails 225, 226. Preferably, the intermediate plate 342 is reinforced by intermediate reinforcement strips 349a, 349b, which extend horizontally along the undersides of the intermediate protective plate 342, as shown in FIG. 3 and which are preferably welded to the intermediate protective plate 342 and to the respective side rails 225, 226.

The intermediate protective plate 342 further contains a drainage opening (not shown), preferably positioned below the motor openings 350 and covered by a drainage panel 351, as shown in FIG. 3. The drainage panel 351 is connected to the intermediate protective plate 342 and can be removed for draining hydraulic fluid.

The third horizontally oriented rear protective plate 343 extends rearwardly a predetermined distance from the rear recessed channel 348. The rear protective plate 343 is positioned between and extends beyond the side rails 225, 226 to define a rearward compartment. Preferably, the rear plate 343 is reinforced by rear reinforcement strips 352a, 352b, that extend horizontally along the undersides of the rear plate 343, as shown in FIG. 3 and which are preferably welded to the rear plate 343. While the preferred embodiment has been described as using reinforcing strips, there are many alternative designs that can provide the desired strength to the structure, as would be known to one skilled in the art. Moreover, two or all of the front, intermediate and rear protective plates can be formed as a unitary structure from a single plate of metal, with recessed channels, formed by stamping and reinforcing as needed, or other methods in accordance with designs known in the art.

As depicted in FIG. 3, the front and a rear-recessed channel 346, 348 extend transversely across the width of the lower frame base portion 340. It should be noted that the recessed channels 346, 348 may have any of a plurality of shapes for seating in mating relation upon the respective crossmember 18a, 18b and may extend in a variety of ways transversely across the lower frame base portion 340, each of such shapes and ways being within the scope of the present invention. For example, the loader machine 1 can foreseeably be manufactured using a single recessed channel.

Figure 4:
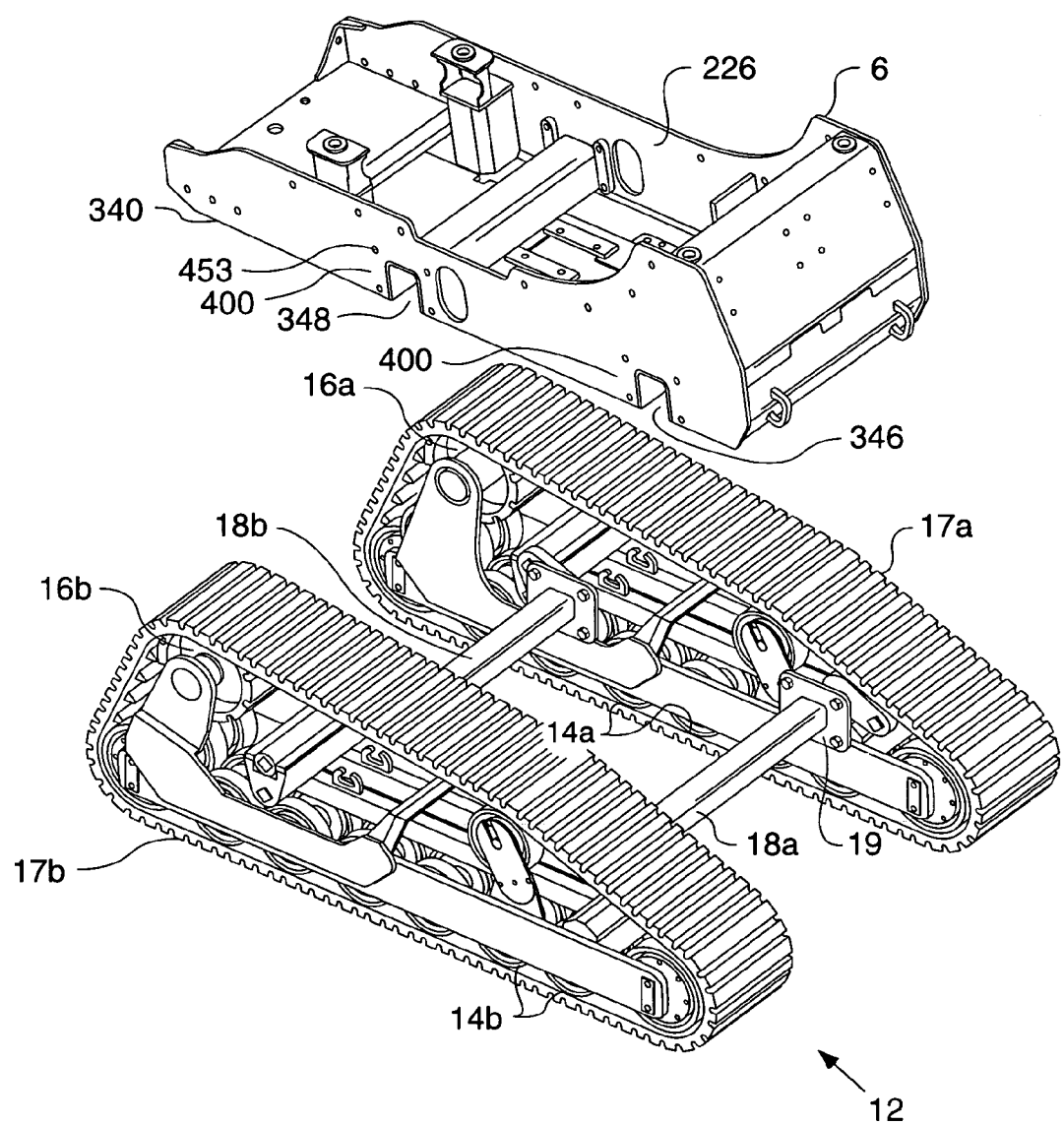
FIG. 4 shows the modular assembly of the lower frame assembly having recessed channels onto a tracked undercarriage having crossmembers.

Referring now to FIG. 4, the modular assembly of the recessed channels 346, 348 of the lower frame assembly 6 onto the associated crossmembers of a tracked undercarriage 12 is shown. The channels 346, 348 are recessed to receive the respective crossmembers 18a, 18b, as shown in FIG. 4. Advantageously, the recessed channels 346,348 permit the modular assembly of the main frame assembly 10 with the undercarriage 12 and increase the torsional stiffness of the lower frame assembly 6 resulting from the use of recessed channels 346, 348. First, for example, vertical and horizontal metal surfaces that form the recessed channel 348 will provide support that is not found where there is simply a flat plate as in a conventional design.

Second, in the assembled loader machine 1, the surfaces of recessed channels 346, 348 rest and are seated against the respective crossmembers 18a, 18b and thereby increase the torsional support for the lower frame and maintain the machine's ground clearance while lowering its center of gravity. Conventional machine frames experience twisting when adverse terrain is encountered because the axles are mounted at the side corners of the machine, thereby providing torsional support only at machine corner locations, such as conventional tire locations. The present invention, however, structurally benefits from the recessed channels 346, 348 because the recessed channels 346, 348 provided added stiffness locally where the crossmembers 18a, 18b mount. Specifically, the crossmember bolts (or crossmember mounting holes) are located close to the recessed channels 346, 348 on the side rails which adds to the stiffness and strength of the design.

Additionally, due to the recessed channels 346,348 of the present invention being seated on the crossmembers 18a, 18b and the bolting of the crossmembers 18a, 18b around the respective channel 346,348, as explained below, the loader machine loads are transmitted across the entire width of the loader machine 1 instead of at the bolting locations. In addition to providing torsional support, the recessed channels 346,348 result in a loader machine 1 with a lower center of gravity while maintaining conventional ground clearance distances. The lower center of gravity provided by the recessed channels 346, 348 further improves overall stability of the loader machine 1.

Furthermore, because the recessed channels 346,348 provide a strengthened belly structure, there is no need to affix a heavy strength steel plate over the protective plates 341, 342,343 of the lower frame assembly 6. Therefore, the lower frame assembly components may be formed of medium strength steel, due to the increased torsional stiffness of the lower frame assembly 6 provided by the strengthened area of the recessed channels. Manufacturing the lower frame components using medium strength steel can reduce the overall weight of the lower frame assembly 6, despite the addition of additional material to form the channels. Moreover, using medium strength steel for lower frame components significantly reduces the manufacturing costs for the lower frame assembly 6, due to the lower cost of the lighter steel.

Referring yet again to FIG. 3, motor openings 350 are formed in each of the side rails 225, 226 of the lower frame assembly 6 for partially receiving hydraulic motors (not shown). Preferably, the motor openings 350 are positioned near the rear recessed channel 348.

The Upper Frame Assembly

Figure 5:
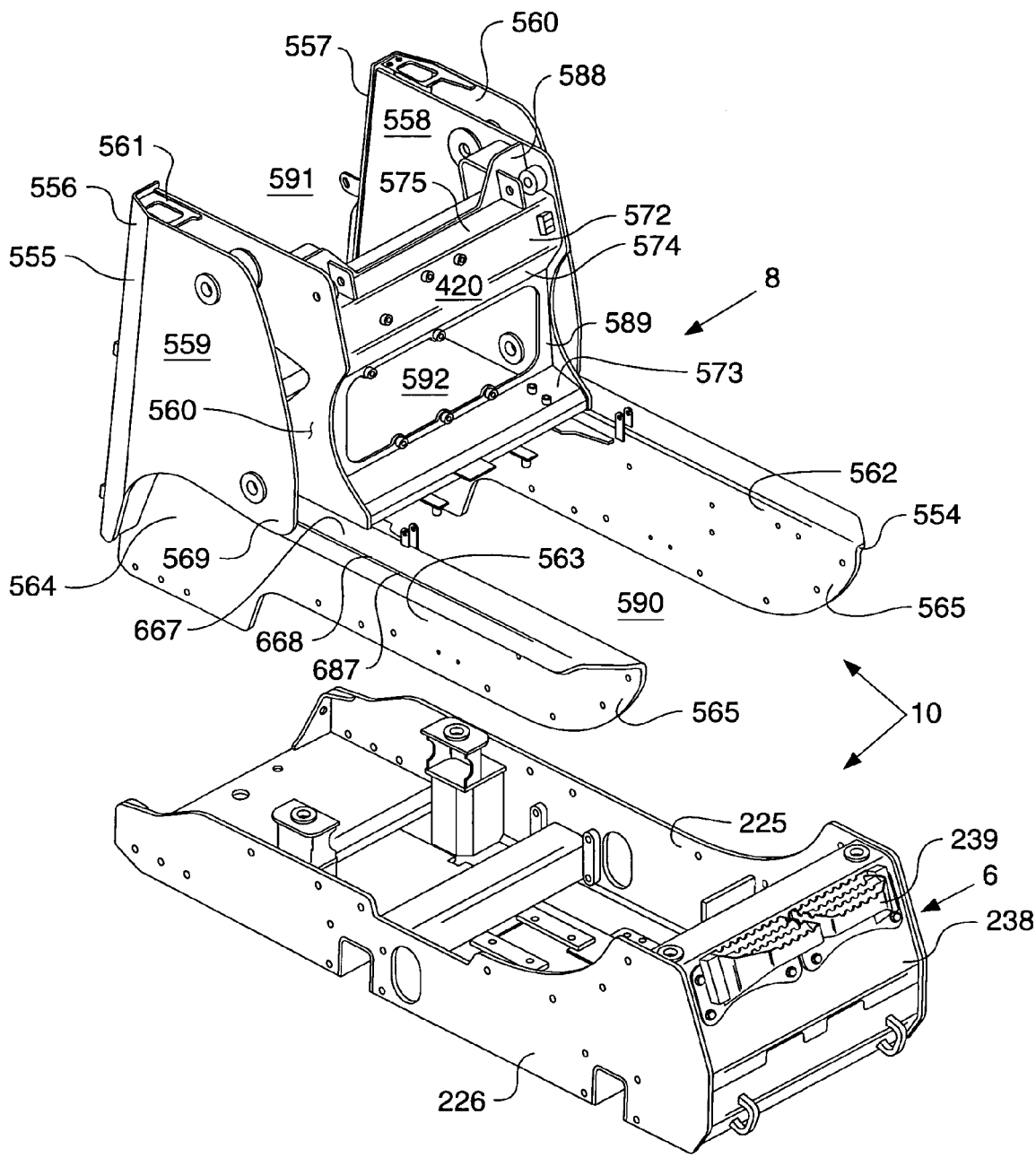
FIG. 5 shows the upper frame assembly and the lower frame assembly before they are connected to form the main frame assembly.

Referring now to FIG. 5, a perspective view of the upper frame assembly 8 and the lower frame assembly 6, before being connected to form a main frame assembly 10 is shown. In particular, the upper frame assembly 8 has front and rear end portion 554, 555. A pair of spaced tower assemblies 556, 557 are positioned near the rear portion 555 of the upper frame assembly 8. According to one embodiment, each of the pair of tower assemblies 556, 557 includes metallic inner and outer plates 558, 559. Preferably, the outer plates 559 are formed for welded connection with the inner plates 558 to define a spatial region 560 therebetween. More preferably, the inner plates 558 each have a contoured airflow defined therein. The inner and outer plates 558, 559 each have a predetermined height and width. Preferably, each of the pair of tower assemblies 556, 557 are rigidly supported by a plurality of metallic strengthening members welded between the inner and outer plates 558, 559, some of which are shown at 561 in FIG. 5.

A pair of metallic side members 562, 563 extend along the entire length of the upper frame assembly 8 and have a shorter length than the length of the side rails 225, 226 of the lower frame assembly 6. Each one of the pair of side members 562, 563 are connected to a respective tower assembly 556, 557 by disposing a rear end portion 564 of the side members 562, 563 within a portion of the spatial regions 560. As indicated in FIG. 5, a front-end portion 565 of the side members 562, 563 extends longitudinally from each pair of tower assemblies 556, 557. Each of the pair of side members 562, 563 are formed to define a side wall 666, as shown more clearly in FIG. 6, with a plurality of mounting holes (not shown) positioned along the length of the upper frame assembly 8.

Referring now to FIG. 6, a side view of the main frame assembly 10 is shown. Specifically, an upper wall 667 of the side members 562 is substantially perpendicular to the side wall 666 and preferably includes a bent flange 668 which extends substantially along the length of the upper frame assembly 8. The bent flange 668 has a mounting surface 687 substantially parallel with the side wall 666 and spaced therefrom.

Turning again to FIG. 5, each of the inner plates 558 of the pair of tower assemblies 556, 557 is welded to the upper wall 667 of the respective side member 562, 563 along a portion of the length thereof. Each of the outer plates 559 of the pair of tower assemblies 556, 557 has a middle portion 569 which is connected to the bent flange 668 at the mounting surface 687 of the respective side member 562, 563 along a portion of the length thereof.

A crossmember assembly 572 is connected between the pair of tower assemblies 556, 557 and side members 562, 563. The crossmember assembly 572 is positioned between the front and rear end portions 565, 564 of the side members 562, 563. The crossmember assembly 572 includes lower and upper crossmembers 573, 574, which are formed using metallic plates. The upper crossmember 574 also has an upper substantially planar surface 575.

A frame structure 588 is partially defined by the inner plates 558 of the tower assemblies 556, 557 and includes a cross plate 589, which extends between the inner plates 558. The upper and lower crossmembers 574, 573 are welded to the frame structure 588, along the cross plate 589, for connection between the inner plates 558.

The crossmember assembly 572 and the front end portions 565 of the side members 562, 563 define an open access area 590 between the independent side members 562, 563, which is unobstructed by structural elements of the upper frame assembly 8. The crossmember assembly 572, the rear end portions 564 of the side members 562, 563, and the pair of tower assemblies 556, 557 define an open service area 591, which is separated from the open access area 590 by the crossmember assembly 572. Further, the cross plate 589 defines an open region 592 between the upper and lower crossmembers 574, 573 which provides access and air communication between the open access area 590 and open service area 591.

A cab mounting structure of any suitable type is connected on each of the inner plates 558 of the tower assemblies 556, 557 within the frame structure 588 at a juncture between the upper surface 575 of the upper crossmember 574 and the cross plate 589.

A method for assembling the loader machine 1 of the present invention includes manufacturing the lower frame assembly 6 and upper frame assembly 8 as described above and shown in FIG. 1. Additionally, the lower frame assembly 6 and upper frame assembly 8 may further receive various sub-components prior to their being mounted together.

Modular Assembly of the Main Frame with the Undercarriage

Using the structure described above, specifically the recessed channels 346, 348 and associated crossmembers 18a, 18b, the multi-terrain loader, and other machines, may be assembled to an undercarriage 12 using a variety of modular assembly methods. A preferred modular assembly method of the present invention, using the structures graphically illustrated in FIG. 4, is illustrated using the dashed line in FIG. 7. A second preferred modular assembly method of the present invention, using the structure graphically illustrated in FIG. 1, is illustrated by a solid line in FIG. 7.

A preferred modular manufacturing method, using the structure illustrated in FIG. 4, involves the mounting of a lower frame assembly 6, having recessed channels 346, 348, onto the respective crossmembers 18a, 18b of an undercarriage 12. In this particular embodiment, the modular assembly of a loader machine is manufactured from the bottom of the machine to the top of the machine. It is important to emphasize that the intermediate components utilized to build the loader machine, such as the lower frame assembly 6, upper frame assembly 8 and undercarriage 12, may all be pre-manufactured and inventoried, thereby requiring minimal process steps to build a complete skid steer loader.

As shown by the flowchart of FIG. 7, the lower frame assembly, having a structure similar to that disclosed above, may initially be assembled or taken from inventory storage in step S1. Similarly, the undercarriage assembly, having a structure similar to that described above, may be modularly assembled or taken from inventory storage in step S5. The lower frame assembly may either be directly mounted to the undercarriage as in step S9 or the upper frame assembly may first be mounted onto the lower frame assembly to create a main frame assembly as in step S7.

The dashed line in FIG. 7 represents a modular assembly method wherein the lower frame assembly 6 is initially assembled or taken from industry storage in step S1 and the undercarriage 12 is initially assembled or taken from inventory storage as in step S5, and the lower frame assembly is directly mounted onto the undercarriage in step S9. Specifically, the recessed channels of the lower frame assembly 6 accept the corresponding crossmembers 18a, 18b of the undercarriage 12, thereby mounting the undercarriage 12 with the lower frame assembly 6 to create a base for building the loader machine 1. In this regard, an upper frame assembly, having the structure described above, is either assembled directly onto the lower frame assembly/undercarriage or removed from inventory in step S3 and bolted onto the side rails of the lower frame assembly to create a main frame assembly on an undercarriage at step S11. The main frame assembly is supplied with the sub-components, such as a cooling system and hydraulic pump assembly, as necessary to create a completed loader machine at step S10.

A second embodiment of a modular manufacturing method, using the structure illustrated in FIG. 1, involves the mounting of a fully assembled main frame assembly to a tracked undercarriage. Moreover, the solid line depicted in FIG. 7 represents the corresponding manufacturing method using the structural design of the present invention. Specifically, the lower frame assembly and upper frame assembly are initially assembled or taken from inventory in step S1 and S3 respectively. The upper frame assembly is then bolted onto the lower frame assembly to create a main frame assembly in step S7. The main frame assembly is then mounted onto the undercarriage in step S8 wherein the recessed channels 346, 348 of the newly created main frame assembly 10 are mounted over the corresponding crossmembers 18a, 18b of the undercarriage 12. As necessary, sub-components are added to the lower frame assembly, upper frame assembly and main frame assembly, thereby resulting in a completed loader machine 1 in step S10.

INDUSTRIAL APPLICABILITY

The main frame assembly 10, as described above, is operably configured to be modularly assembled using pre-assembled, intermediate components such as the lower frame assembly 6, upper frame assembly 8 and undercarriage 12. Although the features of the invention are demonstrated in the manufacture and assembly of a multi-terrain loader machine, it should be recognized that the recessed channels 346, 348 may be utilized with a plurality of main frame assemblies 10 and undercarriages 12 having associated crossmembers 18a, 18b. The ability to manufacture various work machines, from a common lower frame assembly 6, helps decrease manufacturing and assembly costs and increase production flexibility.

Further, the structure of the present invention allows intermediate components of the loader machine 1, such as the lower frame assembly 6, the upper frame assembly 8 and the undercarriage 12, to be pre-manufactured and stored in inventory. The production of multiple loader machines, having a variety of main frame assemblies and undercarriages may be efficiently built by simply supplying the necessary components from inventory to the production line. Advantageously, the main frame assembly 10 and undercarriage 12 may be built at two different sites, for the sake of efficiency, and even modularly assembled at a third site. For example, modular assembly may enable a manufacturer to first mount only a lower frame assembly 6 onto the crossmembers 18*a*, 18*b* of the fully assembled undercarriage 12 and then, at the same or a different location, attach the upper frame assembly 8 to the lower frame assembly 6, thereby providing a completed loader machine 1.

Each recessed opening 346, 348 is engagingly associated with a respective crossmember 18*a*, 18*b* of the pre-assembled undercarriage 12, thereby allowing for the modular assembly of the loader machine 1 when the recessed openings 346, 348 of the lower frame assembly 6 are mounted over the crossmembers 18*a*, 18*b* of the pre-assembled undercarriage 12. Therefore, the recessed channels 346, 348 and structure of the present invention allow for maximum component interchangeability, thus resulting in a more efficient manufacturing process. The detachable feature inherent in the structure of the present invention allows the loader machine 1 to be easily detached in order to ease care and maintenance of the machine parts.

Additionally, because the recessed channels 346, 348 extend across the width of the base 340 of the lower frame 6, the weight and axial loads of the loader machine 1 are evenly distributed along the crossmembers 18*a*, 18*b*. This structural advantage also increases the ground clearance of the loader machine 1 and lowers the machine's center of gravity, thus, resulting in increased torsional support, external torsion strength and overall machine stability.

Other aspects, objects and advantages of this invention can be obtained from a study of the drawings, disclosure and the appended claims.

What is claimed is:

1. A frame assembly for a loader machine, said loader machine having an undercarriage including a first and a second crossmember, wherein said undercarriage is a tracked undercarriage having a first and a second ground engaging member, said frame assembly comprising:
    a main frame assembly having a base portion;
    a first recessed channel defined on said base portion and extending across the width of said base portion, wherein said first recessed channel is positioned to seat directly on said first crossmember of said undercarriage; and
    a second recessed channel defined on said base portion and extending across the width of said base portion, wherein said second recessed channel is positioned to seat directly on said second crossmember of said undercarriage.

2. The frame assembly of claim 1 wherein said first and second recessed channels are positioned between a front and a rear section of said main frame assembly.

3. The frame assembly of claim 1, wherein said main frame assembly includes:

an upper frame assembly having a pair of space tower assemblies, a pair of side members having front and rear portions with each of said side members being connected to a respective one of the pair of tower assemblies and extending longitudinally therefrom, and a crossmember assembly extending between the pair of tower assemblies for connection therewith; and a lower frame assembly having a pair of spaced vertically oriented side rails and a front wall extending continuously between said side rails for connection therewith, said upper frame assembly is mounted to said lower frame assembly at a connection between said side members of said upper frame assembly and said respective side rails of said lower frame assembly.

4. The frame assembly of claim 3, wherein said lower frame assembly is formed of medium strength steel.

5. The frame assembly of claim 3, wherein said lower frame assembly further includes said base portion and said first and second recessed channels.

6. The frame assembly of claim 3, wherein said crossmember assembly is disposed between said front and rear end portions of said upper frame assembly.

7. The frame assembly of claim 3, wherein said side members of said upper frame assembly extend along said side rails of said lower frame assembly a predetermined distance and terminate rearward of said front wall.

8. The frame assembly of claim 1, wherein said first and second recessed channels define a strengthened region of said main frame assembly and are operable to provide torsional stiffness to said loader machine.

9. A method of making a loader machine comprising the steps of:
    providing an undercarriage having a first and a second crossmember;
    providing a frame assembly having a base portion, front and rear sections, and a first and a second recessed channel defined on said base portion and extending across the width of said base portion; and
    mounting said frame assembly to said undercarriage, wherein said first recessed channel is seated on said first crossmember and said second recessed channel is seated on said second crossmember.

10. The method of making a loader machine of claim 9, wherein said undercarriage is a tracked undercarriage having a first and a second ground engaging member connected by at least one of said first and second crossmembers.

11. The method of making a loader machine of claim 10, wherein said first and second ground engaging members are track assemblies.

* * * * *